May 30, 1950  G. E. CRAFT  2,509,560
DIFFERENTIAL MECHANISM
Filed Oct. 2, 1946  2 Sheets-Sheet 1
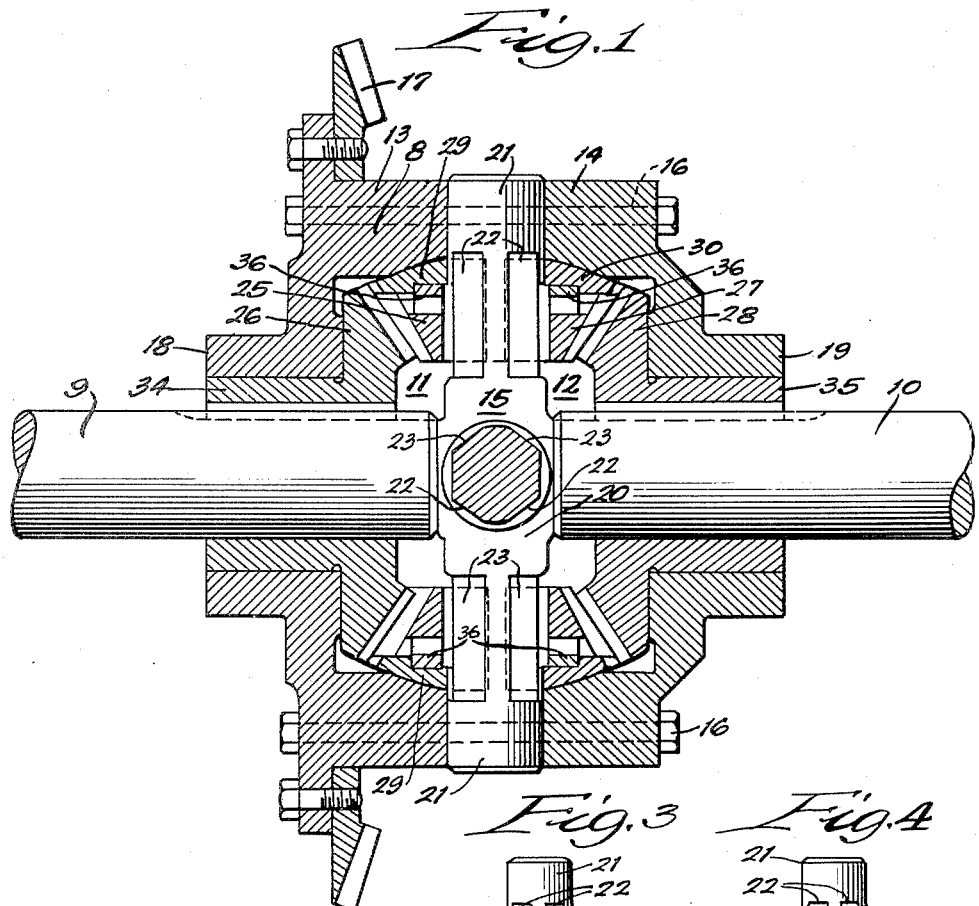
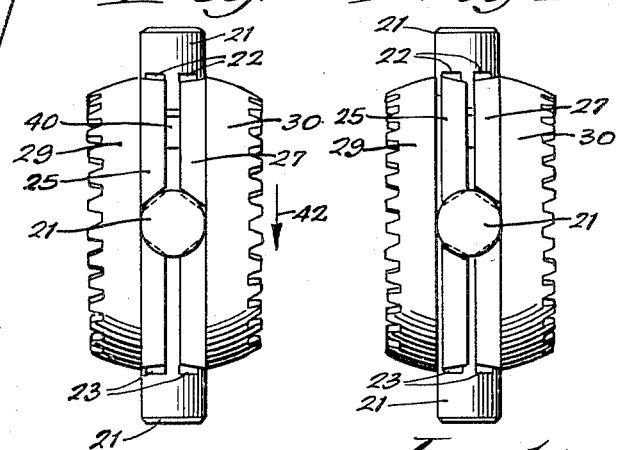
Inventor:
George E. Craft,
By Evans, Pond & Anderson
Attorneys.

May 30, 1950 — G. E. CRAFT — 2,509,560
DIFFERENTIAL MECHANISM
Filed Oct. 2, 1946 — 2 Sheets-Sheet 2

Inventor:
George E. Craft,
By Soans, Pond & Anderson
Attorneys.

Patented May 30, 1950

2,509,560

UNITED STATES PATENT OFFICE 2,509,560

DIFFERENTIAL MECHANISM

George E. Craft, Mount Clemens, Mich., assignor to Frank M. Lewis, Mount Clemens, Mich.

Application October 2, 1946, Serial No. 700,663

3 Claims. (Cl. 74—650)

The differential mechanism of practically every motor-driven vehicle, designed to permit one drive wheel to over-run the other on curves, presents the problem of getting the vehicle under way if one of the wheels has a traction condition materially less than that of the other wheel. The well-known spinning of one of the wheels is an inevitable consequence. Various attempts have been made to overcome this difficulty by constructing differentials which would deliver the driving power effectively to both wheels, yet allow for the imperative need for either of the wheels to over-run the other when the vehicle is rounding a curve. However, it would appear that, because of defects or limitations inherent therein, these prior constructions have met with little or no success as substitutes for the standard type of differential mechanism with which motor-driven vehicles normally are equipped.

The main objects of this invention, therefore, are to provide an improved form of differential mechanism for use with motor-driven vehicles which will deliver the power independently to each driving wheel but which will permit over-running of either wheel when the vehicle is rounding a curve; to provide a differential of this kind wherein the driving clutch element is automatically held retracted from driving relationship with either of the co-acting driven clutch elements so long as the velocity of the respective wheel exceeds that of the driving member and wherein the clutch elements resume their normal driving relationship when the velocity of the respective wheel has been overtaken by the velocity of the driving member; and to provide a differential mechanism of this kind so constructed as to be conveniently substituted for the differential of the standard type with which practically all of the commercial motor-driven vehicles come equipped.

A differential mechanism embodying the preferred form of this invention is shown in the accompanying drawings, in which:

Fig. 1 is a vertical sectional view of the construction;

Fig. 3 is a front elevation of such as assembled differential mechanism, on a scale reduced from that employed for Figs. 1 and 2, showing the position of the parts during the forward driving of both driven members by the driving member;

Fig. 4 is a similar elevation showing the relationship of the several parts when the velocity of one of the driven members has exceeded the velocity of the driving member;

Figure 2:
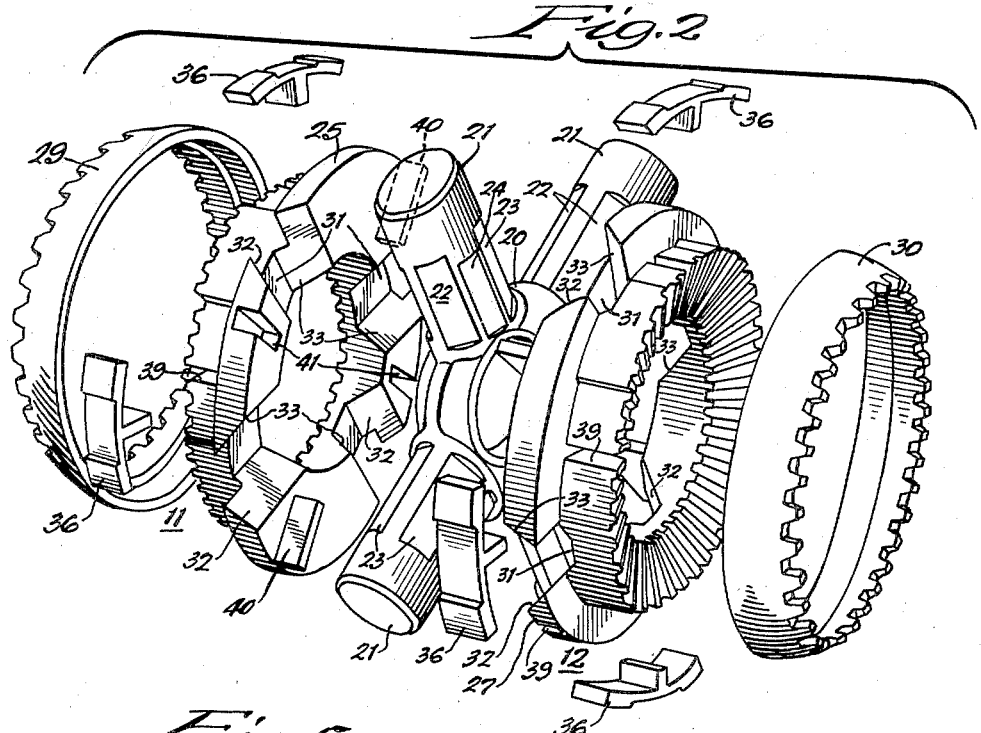
Fig. 2 is an expanded view of the several parts which go to make up the driving section of the preferred form of the differential.

The preferred form of differential mechanism, constructed in accordance with this invention, comprises a main driving member 8 and a pair of driven members 9 and 10, the latter of which are adapted to be operatively connected with the former through the medium of clutch mechanisms 11 and 12 and which are of a construction and operation such that the power of the driving member 8 is applied independently to driven members 9 and 10 except when the velocity of one of said driven members is caused to exceed the velocity of the driving member.

The main driving member 8 is of a more or less conventional construction. As shown it comprises a pair of parts 13 and 14 between which and rotatable therewith is arranged a spider 15. These parts are secured in their assembled relationship by sets of bolts and nuts 16 and provide a housing for the clutch mechanisms 11 and 12. A gear 17 is secured to the member 13 and adapted to mesh with the usual gear connected in the usual manner to the propeller shaft of the motor-vehicle transmission. As will be noted, from the drawings, the members 13 and 14 provide bearings 18 and 19 for the driven elements 26, 28 of the clutch mechanisms 11 and 12.

The spider 15, as is most clearly shown in Fig. 2, has a hub section 20 which is interposed between the ends of the driven members 9 and 10. Out from this extend a plurality of radial arms 21 the upper ends of which fit between the members 13 and 14. Each of the arms 21, intermediate the hub 20 and the outer ends thereof, is recessed to provide pairs of cam surfaces 22 and 23 which co-act with complementary cam surfaces on the clutch mechanisms 11 and 12, as will appear more fully hereinafter. The recesses 24 (see Fig. 2) are formed on the spider arms 21 merely for the purpose of clearance of the parts of the clutch mechanisms 11 and 12 which co-act with the spider 15.

The clutch mechanisms 11 and 12, as shown in Fig. 1, comprise pairs of annular elements 25—26 and 27—28, and drag rings 29 and 30. Through the co-action of these parts the driven members 9 and 10 are connected in independent positive driving relationship with the driving member 8, when the motor vehicle is to be propelled directly forwardly or rearwardly. However, either one of the driven members 9 or 10 is permitted to over-run the other when the motor vehicle is rounding a curve.

The clutch elements 25 and 27 are in the form of flanged annular members. The outer axial faces are provided with serrations simulating gear teeth whereas the inner faces are formed with recesses 31 adapted to receive the radial arms 21 of the spider 15. These recesses 31 are formed so as to provide pairs of circumferentially-spaced opposed cam surfaces 32 and 33, divergently disposed axially of said elements and adapted to co-act with the respective cam surfaces 22 and 23 on the corresponding sides of the spider arms 21.

The circumferential spacing of the cam surfaces 32 and 33 is slightly greater than the corresponding distance between the opposed cam surfaces 22 and 23 on the spider arms 21. This difference in spacing is enough so that both of the cam surfaces 32 and 33, on one of the elements 25 or 27, are brought into contact or nearly into contact with the co-acting cam surfaces on the spider arms 21 when one of said elements has been shifted axially inward against the spider arms, as shown in Fig. 4.

The clutch elements 26 and 28 are likewise annular members. The inner faces are provided with serrations simulating gear teeth to mesh with the gear teeth on the elements 25 and 27. The hub portions 34 and 35 are keyed respectively to the driven members 9 and 10.

The drag rings 29 and 30 are concentrically arranged on the toothed portions of the respective elements or members 25 and 27 outwardly of the flanges wherein are formed the cam surfaces 32 and 33. These drag rings 29 and 30 are supported concentrically of the respective elements or members 25 and 26 by resilient means either in the form of a plurality of T-shaped spring members 36 or a polygonal-shaped spring member 37. By such resilient means the rings 29 and 30 and the elements or members 25 and 27 are held in frictional rotative relationship regardless of the relative axial relationship of said parts.

The rings 29 and 30 are formed with teeth beyond and conforming with the teeth on the respective clutch members 25 and 26. Thus the rings 29 and 30 remain constantly in mesh with clutch elements 26 and 28 and rotate therewith. Moreover, the drag rings are held against axial shifting between the elements 26 and 28 and the spider 15.

The T-shaped resilient members 36 have the stems thereof located in slots 39 formed in the toothed parts of the elements or members 25 and 27. Preferably there are four of these arranged around the periphery of said elements. The curve of these members is on a radius different from the radius of the elements 25 and 27 and rings 29 and 30. Thus, when assembled between said members and the rings the curvature of the members 36 is altered so as to produce a constant resilient pressure between the respective parts.

Each of the elements or members 25 and 27 has a pair of diametrically-opposed lugs 40 and a pair of diametrically-opposed recesses 41 formed on the inner faces of the flanged parts thereof. The pairs of lugs are disposed at a 90° angle from the pairs of recesses 41. The elements or members 25 and 27 are so angularly positioned that the lugs 40 on one of the elements fit in the recesses 41 on the other element. However, the recesses 41 are slightly greater than the thickness of the lugs 40. By these interfitting lugs and recesses the elements 25 and 27 are held against relative radial shifting except to the extent permitted by the spacing of the cam surfaces 22 and 23 on the spider arms 21 in relationship to the cam surfaces 32 and 33 on the elements 25 and 27, as hereinbefore pointed out.

The operation of this improved differential mechanism is as follows:

The application of power to the gear 17, by the usual transmission mechanism, will cause the rotation of the driving member 8 forwardly or rearwardly depending upon the position of the gear shift. The action of this differential mechanism will be the same regardless of the direction of the rotation of the driving member 8.

Assuming that the forward rotation is in the direction of the arrow 42 (see Fig. 3) the spider 15 will of necessity move with the driving member 8. Such movement of the spider 15 will bring the advancing cam surfaces 22 on each of the arms 21 of the spider 15 into contact with the opposed pair of cam surfaces 32 on the clutch elements or members 25 and 27. The pressure of these angularly-disposed cam surfaces on the spider arms against the corresponding cam surfaces on said elements or members 25 and 27 will cause the elements 25 and 27 to be forced axially outwardly to mesh with the gear teeth on said elements with the gear teeth on the driven elements 26 and 28. Thus the driven members 9 and 10 will be caused to rotate in unison with the driving member 8.

The pairs of clutch members 25—26 and 27—28 being thus held in co-acting driving relationship, the force of the motor vehicle power unit will be uniformly and independently applied to both of the wheels attached to the driven members 9 and 10. Therefore, at all times both of the wheels will attempt to move the vehicle forward notwithstanding the traction conditions of either one or both of the wheels. If perchance the traction condition of one of the wheels is relatively poor compared to that of the other, there will be no "spinning" of the one wheel, as is characteristic with motor vehicles equipped with the conventional differential.

In the event the vehicle negotiates a curve, the power for continuing the forward movement of the vehicle will continue to be delivered to the wheel on the inside curve. The outside wheel, however, will of necessity have its velocity exceed the velocity of the driving member 8.

Assuming, for example, that the outside wheel is the one attached to the driven member 9, the velocity of the clutch element or member 26 will tend to exceed the velocity of the co-acting clutch member 25, the velocity of which is obviously limited to that of the driving member 8. As a result of this accelerated velocity of the clutch element or member 26, over the co-acting clutch element or member 25, the gear teeth on the element 26 will have a cam action on the gear teeth on the element 25 and tend to shift the element 25 axially so as to disengage the gear teeth and permit the clutch element 26 to rotate faster than and free from its relationship with the clutch element or member 25.

The axial shifting of the clutch element or member 25 is accompanied by a slight rotative movement which is permitted by reason of the spacing of the cam surfaces 32 and 33 as hereinbefore pointed out. This combined axial and slight rotative movement of the clutch element or member 25 tends to bring the cam surfaces 33 on the element 25 into contact with the corresponding cam surfaces 23 on the trailing side of the spider arms 21. Such position of the parts is clearly shown in Fig. 4.

Figure 5:
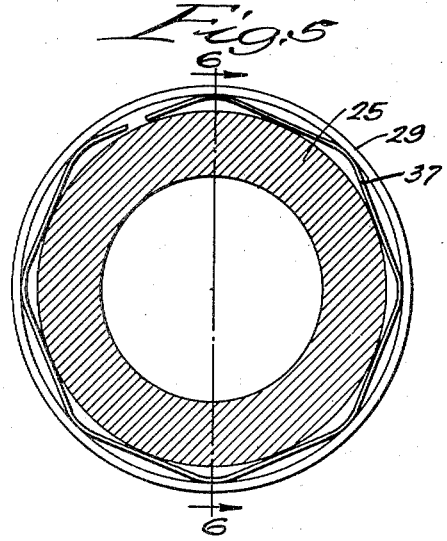
Fig. 5 is a radial sectional view of one of the gear and ring assemblies showing a modified form of spring by means of which the clutch members are held in their non-driving relationship.
Figure 6:
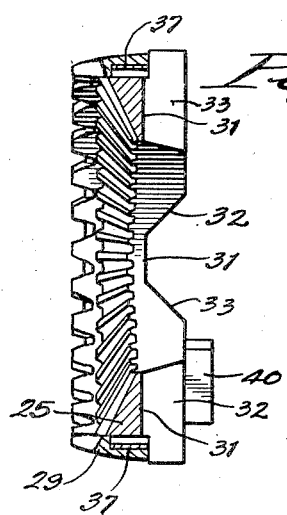
Fig. 6 is a view of the same taken on the line 6—6 of Fig. 5.

Inasmuch as the spring member 36 (or spring member 37 in the case of the modification shown in Fig. 5) keep a constant pressure between either of the clutch elements 25 and its corresponding drag ring 29, the clutch element 25 is yieldingly held in its axially-shifted position with the gear teeth out of engagement with the gear teeth on the clutch element 26.

The clutch elment 25 will remain in its axially shifted position until the velocity of the driven member 9 recedes to approximate the velocity of the driving member 8. Thereupon the cam surface 22 on the advancing face of the arms 21 of the spider 15 will contact the opposed cam surfaces 32 on the clutch element 25 and so press against the clutch element 25 that it will be shifted axially outward to restore the meshing engagement of the gear teeth thereon with the teeth on the clutch element 26. This reestablishes the normal positive driving relationship of the driving member 8 with the driven member 9.

Other variations and modifications in the details of structure and arrangement of the parts may be resorted to within the spirit and coverage of the appended claims.

I claim:

1. Differential mechanism of the class described comprising, a driving member and a pair of driven members, a spider interposed between said driven members and connected to rotate with said driving member, a pair of serrated elements adapted to connect each of said driven members with said driving member, one of the elements of each pair being fixed to rotate with the respective driven member and the other element being mounted to rotate with said spider but being axially shiftable relative thereto into and out of intermeshing engagement with said one element, a ring embracing said other element of each of said pair of elements and being free to rotate on said other element relative to said spider and said one element, and resilient means interposed between each ring and said other element and adapted to hold the respective element in its axially shifted position relative to said ring.

2. Differential mechanism of the class described comprising, a driving member, a pair of driven members, a spider interposed between said driven members and having its radially-disposed arms connected to rotate with said driving member, an annular member located on each side of said spider and recessed to receive the radial arms of said spider, said spider arms and each of said annular members at said recesses having coacting cam surfaces formed thereon the planes of which on opposite radial sides of said arms are oppositely inclined and radially spaced so that when said cam surfaces on one side of a spider arm are in contact the cam surfaces on the opposite side of said spider arm are slightly out of contact, each of said annular members having gear teeth formed on the outer face thereof, an annular member fixed on each of said driven members and having gear teeth formed thereon to mesh with the gear teeth on the opposed annular member, a ring rotatably mounted on each of said first-mentioned annular members outwardly of said spider arms, and resilient means interposed between the annular opposed faces of the respective ring and annular member and adapted to hold said ring and annular member in its axially-shifted position when the respective pair of annular members have been forced out of intermeshing engagement.

3. Differential mechanism of the class described comprising, a driving member, a pair of driven members, a spider interposed between said driven members and having its radially-disposed arms connected to rotate with said driving member, an annular member located on each side of said spider and recessed to receive the radial arms of said spider, said spider arms and each of said annular members at said recesses having coacting cam surfaces formed thereon the planes of which on opposite radial sides of said arms are oppositely inclined and radially spaced so that when said cam surfaces on one side of said spider arm are in contact the cam surfaces on the opposite side of said spider arm are slightly out of contact, each of said annular members having gear teeth formed on the outer face thereof, an annular member fixed on each of said driven members and having gear teeth formed thereon to mesh with the gear teeth on the opposed annular member, a ring rotatably mounted on each of said first-mentioned annular members outwardly of said spider arms, resilient means interposed between the annular opposed faces of the respective ring and annular member and adapted to hold said ring and annular member in its axially-shifted position when the respective pair of annular members have been forced out of intermeshing engagement, and lugs formed on the inner face of one of said first-mentioned annular members adapted to engage slightly larger recesses formed in the opposed face of the other said annular member so as to restrict the relative rotation of said first-mentioned annular member.

GEORGE E. CRAFT.

REFERENCES CITED

The following references are of record in the file of this patent:

UNITED STATES PATENTS

| Number | Name | Date |
| --- | --- | --- |
| 1,275,952 | Luxmore | Aug. 13, 1918 |
| 1,286,362 | Lewis | Dec. 3, 1918 |
| 1,292,818 | Lewis | Jan. 28, 1919 |
| 1,430,744 | Lewis | Oct. 3, 1922 |
| 1,477,137 | Lewis | Dec. 11, 1923 |
| 1,619,141 | Lewis | Mar. 1, 1927 |
| 2,397,673 | Lewis | Apr. 2, 1946 |